(12) United States Patent
Tsujimoto (10) Patent No.: US 8,799,660 B2
(45) Date of Patent: Aug. 5, 2014

(54) COMMUNICATION APPARATUS

(75) Inventor: Shohei Tsujimoto, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 529 days.

(21) Appl. No.: 12/727,742

(22) Filed: Mar. 19, 2010

(65) Prior Publication Data

US 2010/0250950 A1  Sep. 30, 2010

(30) Foreign Application Priority Data

Mar. 31, 2009 (JP) ................... 2009-085913

(51) Int. Cl.
*H04L 29/06* (2006.01)
*H04L 9/32* (2006.01)
*H04L 12/58* (2006.01)

(52) U.S. Cl.
CPC ............ *H04L 9/3247* (2013.01); *H04L 63/123* (2013.01); *H04L 63/0823* (2013.01); *H04L 12/585* (2013.01); *H04L 51/12* (2013.01)
USPC ............ 713/176; 713/151; 713/175; 709/206

(58) Field of Classification Search
CPC . H04L 9/3247; H04L 63/123; H04L 63/0823; H04L 12/585; H04L 51/12
USPC ....................................................... 713/176
See application file for complete search history.

(56) References Cited

U.S. PATENT DOCUMENTS

| | | | |
|---|---|---|---|
| 6,211,972 B1 * | 4/2001 | Okutomi et al. ............... | 358/402 |
| 2002/0080959 A1 * | 6/2002 | Weller ............................ | 380/55 |
| 2005/0231746 A1 * | 10/2005 | Parry et al. .................... | 358/1.13 |
| 2006/0179317 A1 | 8/2006 | Soumiya et al. | |

(Continued)

FOREIGN PATENT DOCUMENTS

| | | |
|---|---|---|
| JP | 2001-352338 A | 12/2001 |
| JP | 2002-190796 A | 7/2002 |

(Continued)

OTHER PUBLICATIONS

Akl, S. G. "Digital Signatures: A Tutorial Survey." IEEE Journals & Magazines, vol. 16, Issue 2, Publication Year: 1983, pp. 15-24.*

(Continued)

*Primary Examiner* — Thanhnga B Truong
*Assistant Examiner* — Narcisco Victoria
(74) *Attorney, Agent, or Firm* — Scully, Scott, Murphy & Presser, PC (57) ABSTRACT

A communication apparatus includes: a first storage unit storing a received electronic mail; a verification unit executing a first verification about an electronic signature attached to the received electronic mail; a printing unit printing the received electronic mail if a verification result of the first verification is positive; a deletion unit deleting the printed electronic mail from the first storage unit; and a storage control unit controlling a second storage unit to store the mail information about the received electronic mail in the second storage unit if the verification result of the first verification is negative. The verification unit again executes the first verification about a specific electronic signature attached to a specific electronic mail which mail information is stored in the second storage unit. The printing unit prints the specific electronic mail if a verification result by again executing the first verification about the specific electronic signature is positive.

9 Claims, 5 Drawing Sheets

(56) References Cited

U.S. PATENT DOCUMENTS

| | | |
|---|---|---|
| 2007/0028097 A1 | 2/2007 | Masui et al. |
| 2007/0061583 A1 | 3/2007 | Kanatsu et al. |
| 2007/0064952 A1* | 3/2007 | Takada et al. ............ 380/286 |
| 2007/0182984 A1* | 8/2007 | Ragnet et al. ............ 358/1.15 |
| 2008/0212782 A1* | 9/2008 | Brettle et al. ............ 380/277 |

FOREIGN PATENT DOCUMENTS

| | | |
|---|---|---|
| JP | 2006-60369 A | 3/2006 |
| JP | 2006-222476 A | 8/2006 |
| JP | 2007-36575 A | 2/2007 |
| JP | 2007-81452 A | 3/2007 |
| JP | 2007-115107 A | 5/2007 |

OTHER PUBLICATIONS

Notification of Reason for Refusal dated Jan. 25, 2011 together with English language translation.

\* cited by examiner

| VERIFICATION TABLE | | 29 |
|---|---|---|
| MAIL ADDRESS (52) | MAIL INFORMATION (INCLUDING TEXT DIGEST 58 AND CERTIFICATE DIGEST 62) (56) | |
| 64 → device_a@mail.com | ABCDE··· | |
| 66 → device_b@mail.com | 12345··· | |
| 68 → device_c@mail.com | AAAAA··· | |
| ⋮ | ⋮ | |
| 70 → device_z@mail.com | ZZZZZ··· | |

FIG. 3

| CERTIFICATE TABLE 30 | | | | |
|---|---|---|---|---|
| KIND 90 | MAIL ADDRESS/NAME 92 | CERTIFICATE DATA 94 | SECRET KEY DATA 96 | |
| CA CERTIFICATE | CA1 | AABBCC... | NONE | ← 98 |
| CA CERTIFICATE | CA2 | DDEEFF... | NONE | ← 102 |
| SELF-DEVICE CERTIFICATE | SELF-ADDRESS | ABC123... | GHI789... | ← 104 |
| DEVICE CERTIFICATE | user_a@mail.com | DEF456... | NONE | ← 106 |
| ... | ... | ... | ... | |
| DEVICE CERTIFICATE | user_z@mail.com | XXYYZZ... | NONE | ← 108 |

FIG. 4

FIG. 5

COMMUNICATION APPARATUS

CROSS-REFERENCE TO RELATED APPLICATIONS

This application claims priority from Japanese Patent Application No. 2009-085913 filed on Mar. 31, 2009, the entire subject matter of which is incorporated herein by reference.

TECHNICAL FIELD

The present invention relates to a communication apparatus, and specifically, to a communication apparatus capable of executing verification of an electronic signature.

BACKGROUND

With communicating data through the Internet, there is a problem of preventing spoofing of a sender.

There has been proposed a known verification technique using an electronic signature in order to prevent the spoofing of the sender. For example, a known art proposes verification of the electronic signature. The known art verifies the electronic signature, which is included in a device certificate attached to electronic mail, using a certification authority certificate issued by a certification authority for authenticating the device certificate. The known art specifies an act of the spoofing of the sender by determining whether or not the device certificate is issued by the certification authority.

A first known art proposes an Internet FAX that adds a verification result and prints electronic mail if verification of an electronic signature is succeeded. A second known art proposes an Internet FAX that prints electronic mail even if verification of an electronic signature is failed.

SUMMARY

Illustrative aspects of exemplary embodiments of the present invention may provide an art capable of providing a printed matter with high reliability for a user, even if verification of an electronic signature is failed.

DETAILED DESCRIPTION

General Overview

The first known art fails to disclose how to handle if the verification of the electronic signature is failed.

In the second known art, a user regards a printed matter, which is obtained if the verification of the electronic signature is failed, as low reliability. That is, if the verification of the electronic signature is failed, the second known art provides only the printed matter with low reliability for the user.

Therefore, illustrative aspects of exemplary embodiments of the present invention may provide an art capable of providing a printed matter with high reliability for a user even if verification of an electronic signature is failed.

The art according to the exemplary embodiment of the invention relates to a communication apparatus. The "communication apparatus" includes all devices for executing communication processing. The communication processing may be processing for sending data or processing for receiving data. An example of the communication apparatus can include a personal computer (hereinafter called a PC), a server, a printer, a scanner, a copy machine, a facsimile, a multi-function device, etc. The communication apparatus includes a receiving unit, a mail storage unit, a verification unit, a printing unit, a deletion unit and a storage control unit.

The receiving unit receives electronic mail. The mail storage unit stores the received electronic mail. Incidentally, the "mail storage unit" may be a volatile storage area or a non-volatile storage area. The verification unit executes first verification about an electronic signature attached to the received electronic mail. The "first verification" includes all verifications about the electronic signature such as verification of a first electronic signature included in a device certificate attached to electronic mail using a certification authority certificate, verification of the expiration date of the device certificate attached to the electronic mail and verification of a second electronic signature attached to the electronic mail. Incidentally, the first electronic signature included in the device certificate means a signature, in which digest data obtained by digesting the portion other than the first electronic signature of the device certificate, is encrypted using a secret key of a certification authority for authenticating the device certificate. The second electronic signature attached to the electronic mail means a signature in which digest data obtained by digesting a text of the electronic mail is encrypted using a secret key of a sending source of the electronic mail. The "first verification" may mean only one verification or two or more verifications of the plural verifications described above.

The printing unit prints the received electronic mail if a verification result of the first verification is positive. Incidentally, the term "if" described above does not exclude addition of other conditions (AND condition and/or OR condition). Other conditions may be added in the case of using the term "if". Hereinafter, the case of using the term "if" is similar. The deletion unit deletes electronic mail printed by the printing unit from the mail storage unit. The storage control unit stores mail information about the received electronic mail in a predetermined storage area if a verification result of the first verification is negative. The "mail information" described above may be the received electronic mail itself or other information (for example, a mail ID) capable of specifying the received electronic mail. The "predetermined storage area" described above may be included or not included in the mail storage unit. When the predetermined storage area is included in the mail storage unit and the mail information is the electronic mail itself, "storing the mail information in the predetermined storage area" described above means that storage of the received electronic mail in the mail storage unit is maintained.

In the communication apparatus, the verification unit again executes the first verification about a specific electronic signature that is attached to specific electronic mail, in which the mail information is stored in the predetermined storage area. Further, when again executing the first verification about the specific electronic signature, the printing unit prints the specific electronic mail if a verification result is positive.

According to the communication apparatus, if the verification of electronic signature is failed, mail information about electronic mail failing in the verification can be stored in the predetermined storage area, and the verification of the electronic signature attached to the electronic mail can be again executed. Even if the verification of the electronic signature is failed, the verification can be again executed to print the electronic mail succeeding in the verification. As a result, even if the verification of the electronic signature is failed, it is possible to provide a printed matter with high reliability for a user.

That is, according to a first illustrative aspect of the invention, there is provided a communication apparatus comprising: a receiving unit that is configured to receive electronic mail; a first storage unit that is configured to store the received electronic mail by the receiving unit; a verification unit that is configured to execute a first verification about an electronic signature attached to the received electronic mail; a printing unit that is configured to print the received electronic mail if a verification result of the first verification is positive; a deletion unit that deletes the received electronic mail printed by the printing unit from the first storage unit; a second storage unit that is configured to store mail information about the received electronic mail; and a storage control unit that is configured to control the second storage unit to store the mail information about the received electronic mail in the second storage unit if the verification result of the first verification is negative, wherein the verification unit again executes the first verification about a specific electronic signature attached to a specific electronic mail which mail information is stored in the second storage unit, and wherein the printing unit prints the specific electronic mail if a verification result by again executing the first verification about the specific electronic signature is positive.

According to a second illustrative aspect of the invention, the communication apparatus further comprises: a third storage unit that is configured to store a certification authority certificate, wherein the first verification comprises a verification as to whether or not a certification authority certificate, which is issued by a certification authority for authenticating the electronic signature attached to the received electronic mail, is stored in the third storage unit.

For example, at a point in time of receiving electronic mail, there is a possibility that the communication apparatus does not acquire the certification authority certificate issued by the certification authority for authenticating the electronic signature (the first electronic signature included in the device certificate) attached to the electronic mail. In this case, the electronic mail fails in the first verification. Thereafter, there is a possibility that the communication apparatus acquires the certification authority certificate issued by the certification authority. In this case, when the first verification is again executed with respect to the electronic mail, there is a possibility that the electronic mail succeeds in the first verification and the electronic mail is printed. According thereto, it is possible to provide the printed matter with high reliability.

According to a third illustrative aspect of the invention, in the communication apparatus, wherein the verification unit further executes a second verification for verifying whether or not a first digest, which is generated from a text of the received electronic mail, matches with a second digest, which is included in the electronic signature attached to the received electronic mail, wherein the printing unit prints the received electronic mail if a verification result of the second verification is negative regardless of the verification result of the first verification, and wherein the storage control unit controls the second storage unit to store the received electronic mail if the verification result of the first verification is negative and the verification result of the second verification is positive.

Incidentally, the "second digest" described above may be translated into, for example, a "digest of a text of the received electronic mail".

When the first digest does not match with the second digest, there may not be a possibility of succeeding in the second verification even if the second verification is again executed. According to the above-described communication apparatus, the electronic mail, which does not have a possibility of succeeding in the verification when the verification is again executed, is printed. On the other hand, when the first digest matches with the second digest even if failing in the first verification, there is the possibility of succeeding in the first verification when the first verification is again executed. According to the communication apparatus described above, the electronic mail which succeeds in the second verification and fails in the first verification is constructed so that the electronic mail is stored in the predetermined storage area and the first verification can be again executed.

According to a fourth illustrative aspect of the invention, in the communication apparatus, wherein the printing unit prints the received electronic mail in a first format if the verification result of the first verification is positive, and wherein the printing unit prints the received electronic mail in a second format, which is different from the first format, if the verification result of the second verification is negative.

According thereto, the user can distinguish a printed matter obtained from the electronic mail succeeding in the first verification and the second verification from a printed matter obtained from the electronic mail failing in the first verification or the second verification.

According to a fifth illustrative aspect of the invention, in the communication apparatus, wherein the verification unit again executes the first verification about the specific electronic signature if a user inputs a predetermined instruction.

According thereto, the user can instruct the communication apparatus to again execute the first verification.

According to a sixth illustrative aspect of the invention, the communication apparatus further comprises: a selective permission unit that allows the user to select at least one piece of mail information from plural pieces of mail information stored in the second storage unit, wherein the predetermined instruction is to select the at least one piece of mail information in the selective permission unit, and wherein the verification unit again executes the first verification about the specific electronic signature attached to the specific electronic mail corresponding to the at least one piece of mail information selected by the selective permission unit.

According thereto, the user can select the mail information corresponding to the electronic mail to again execute the first verification from among the plural pieces of mail information.

According to a seventh illustrative aspect of the invention, the communication apparatus further comprises: a specifying unit which, when the at least one piece of mail information is selected in the selective permission unit, specifies mail information about one or more second electronic mail from the second storage unit, attached to the one or more second electronic mails being a second electronic signature that is authenticated by the same certification authority as the certification authority for authenticating the specific electronic signature, wherein, when the at least one piece of mail information is selected in the selective permission unit, the verification unit executes the first verification about the second electronic signature attached to the one or more second electronic mails corresponding to the mail information specified by the specifying unit while again executing the first verification about the specific electronic signature.

For example, after a new certification authority certificate is stored in the communication apparatus, a user may instruct the specific electronic mail, to which the electronic signature authenticated by the certification authority for issuing the certification authority certificate is attached, to again execute the first verification. According to the configuration described above, when the electronic mail is given such instructions, the first verification can be again executed with respect to other electronic mail, to which an electronic signature authenticated by a certification authority that authenticates the electronic signature attached to the again executed electronic mail (that is, an electronic signature authenticated by a certification authority that issues the new certification authority certificate) is attached. The first verification can automatically be again executed with respect to the other electronic mail, which has a possibility of succeeding in the verification when the first verification is again executed using the new certification authority certificate.

According to an eighth illustrative aspect of the invention, in the communication apparatus, wherein the deletion unit further deletes the specific electronic mail in accordance with an instruction from a user.

Incidentally, a computer program and a control method for implementing the communication apparatus described above are novel and useful.

Exemplary Embodiments

Exemplary embodiments of the invention will now be described with reference to the drawings.

A part of the art described in the following embodiment is listed.

(Mode 1) An electronic signature attached to electronic mail may be included in a device certificate attached to the electronic mail. The electronic signature may be a signature, in which a certificate digest which is information other than the electronic signature of the device certificate is encrypted by a secret key of a certification authority. Incidentally, the electronic signature attached to the electronic mail may be a signature, in which a text digest which is a digest of a text of the electronic mail is encrypted by a secret key of a sending source of the electronic mail.

(Mode 2) First verification may include verification of a certification authority certificate including the steps of:

generating a first certificate digest by decoding an electronic signature (a certificate digest encrypted by a secret key of a certification authority) included in a device certificate attached to electronic mail using a public key of the certification authority included in the certification authority certificate issued by the certification authority for authenticating the device certificate;

generating a second certificate digest by digesting information other than the electronic signature of the device certificate; and determining whether or not the first certificate digest matches with the second certificate digest.

(Mode 3) First verification may include verification of the expiration date. The verification determines whether or not the present time and date (for example, the time and date of receipt of electronic mail or the time and date of execution of verification processing) is included in the expiration date of a device certificate attached to electronic mail.

(System Configuration)

Figure 1:
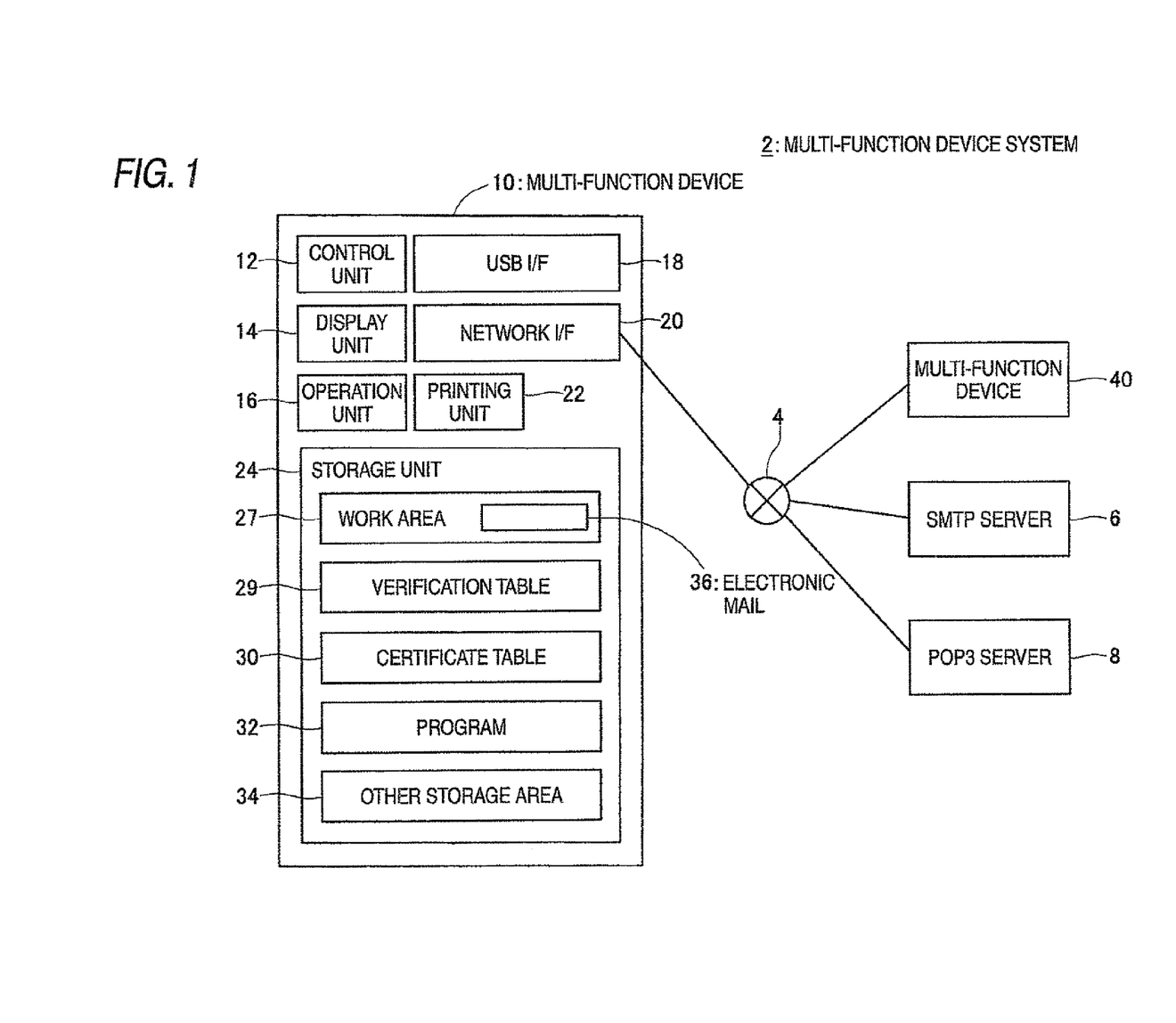
FIG. 1 shows a configuration of a multi-function device system according to an exemplary embodiment of the invention.

FIG. 1 shows a schematic diagram of a multi-function device system 2 according to the exemplary embodiment. The multi-function device system 2 includes the Internet 4, plural multi-function devices 10, 40, an SMTP server 6 and a POP3 server 8. The plural multi-function devices 10, 40, the SMTP server 6 and the POP3 server 8 are connected to the Internet 4. Incidentally, although FIG. 1 shows only the two multi-function devices 10, 40, the number of multi-function devices can be changed properly.

(Encryption Technique by S/MIME)

The multi-function device 10 is a communication apparatus capable of communicating electronic mail using an encryption technique by S/MIME (Secure/Multipurpose Internet Mail Extensions). The multi-function device 40 has a configuration similar to that of the multi-function device 10.

A mechanism at the time when the multi-function device 10 receives electronic mail from the multi-function device 40 using the encryption technique by the S/MIME will hereinafter be described. First, a mechanism at the time when the multi-function device 40 sends electronic mail to the multi-function device 10 will be described. The multi-function device 40 encrypts an electronic mail text using a common key and generates the encrypted electronic mail text. Further, the multi-function device 40 creates a digest of the electronic mail text from the electronic mail text using a hash function, and attaches a signature (hereinafter called an encrypted text digest (that is, a second electronic signature)) obtained by encrypting the digest using a secret key of the multi-function device 40 to the electronic mail. Further, the multi-function device 40 attaches its own device certificate (a device certificate of the multi-function device 40) to the electronic mail. That is, the encrypted text digest and the device certificate of the multi-function device 40 are attached to the electronic mail. The multi-function device 40 sends the electronic mail to the multi-function device 10. Incidentally, the device certificate of the multi-function device 40 includes a public key of the multi-function device 40, an electronic mail address of the multi-function device 40, information about a certification authority which is an issue source of the device certificate of the multi-function device 40, a first electronic signature (that is, a signature (hereinafter called an encrypted certificate digest) obtained by encrypting digest data in which information other than the first electronic signature of the device certificate is digested by a secret key of the certification authority) generated by the certification authority, and information about the expiration date of the device certificate, etc. The multi-function device 40 encrypts the common key by a public key of the multi-function device 10 and sends the encrypted common key to the multi-function device 10. The public key of the multi-function device 10 is included in a device certificate of the multi-function device 10. It is necessary for the multi-function device 40 to previously acquire the device certificate of the multi-function device 10.

Next, a mechanism at the time when the multi-function device 10 receives electronic mail from the multi-function device 40 will be described. The multi-function device 10 decodes an encrypted common key by a self-secret key and acquires the common key. Further, the multi-function device 10 decodes an encrypted electronic mail text using the acquired common key and acquires the electronic mail text. Since the electronic mail text sent from the multi-function device 40 to the multi-function device 10 is encrypted, a third party can be prevented from sneaking a look at the electronic mail text. Also, the multi-function device 10 generates first digest data by decoding an encrypted text digest attached to the electronic mail using the public key of the multi-function device 40. The public key of the multi-function device 40 is included in the device certificate of the multi-function device 40. It is necessary for the multi-function device 10 to previously acquire the device certificate of the multi-function device 40. Further, the multi-function device 10 generates second digest data by digesting the electronic mail text by the self. The multi-function device 10 can specify an act of falsifying the electronic mail text by determining whether or not the first digest data matches with the second digest data. Incidentally, the encrypted common key sent from the multi-function device 40 to the multi-function device 10 may be sent in a state of being attached to the electronic mail together with the encrypted electronic mail text or may be previously sent by communication processing different from the electronic mail.

Further, the multi-function device 10 determines whether or not a certification authority certificate (hereinafter called a target certification authority certificate) issued by the certification authority for authenticating the device certificate of the multi-function device 40 attached to the electronic mail is stored. When the target certification authority certificate is stored in the multi-function device 10, the multi-function device 10 generates first digest data by decoding an encrypted certificate digest included in the device certificate of the multi-function device 40 attached to the electronic mail using a public key of the certification authority included in the target certification authority certificate. Further, the multi-function device 10 generates second digest data by digesting information other than the encrypted certificate digest in the device certificate of the multi-function device 40 attached to the electronic mail. The multi-function device 10 determines whether or not the first digest data matches with the second digest data and an electronic mail address of the multi-function device 40 included in the device certificate of the multi-function device 40 attached to the electronic mail matches with an electronic mail address of a sending source of the electronic mail. Consequently, an act of spoofing can be specified.

(Configuration of Multi-Function Device 10)

Subsequently, a configuration of the multi-function device 10 will be described.

The multi-function device 40 has a configuration similar to that of the multi-function device 10. The multi-function device 10 includes a control unit 12, a display unit 14, an operation unit 16, a USB interface 18, a network interface 20, a printing unit 22, a storage unit 24, etc. The control unit 12 executes processing according to a program 32 stored in the storage unit 24. The display unit 14 displays various pieces of information. The operation unit 16 includes plural keys. A user can input various instructions to the multi-function device 10 by operating the operation unit 16. USB memory (not shown) etc. are connected to the USB interface 18. The network interface 20 is connected to the Internet 4. The printing unit 22 prints image data.

The storage unit 24 includes a work area 27, a verification table 29 and a certificate table 30. Received electronic mail 36 is stored in the work area 27. Information about electronic mail which fails in verification is stored in the verification table 29. Various certificates are stored in the certificate table 30. The storage unit 24 further stores the program 32 to be executed by the control unit 12. Further, the storage unit 24 includes a storage area 34 for storing information other than each information 36, 29, 30 and 32 described above.

(Stored Contents of Verification Table 29)

Figure 2:
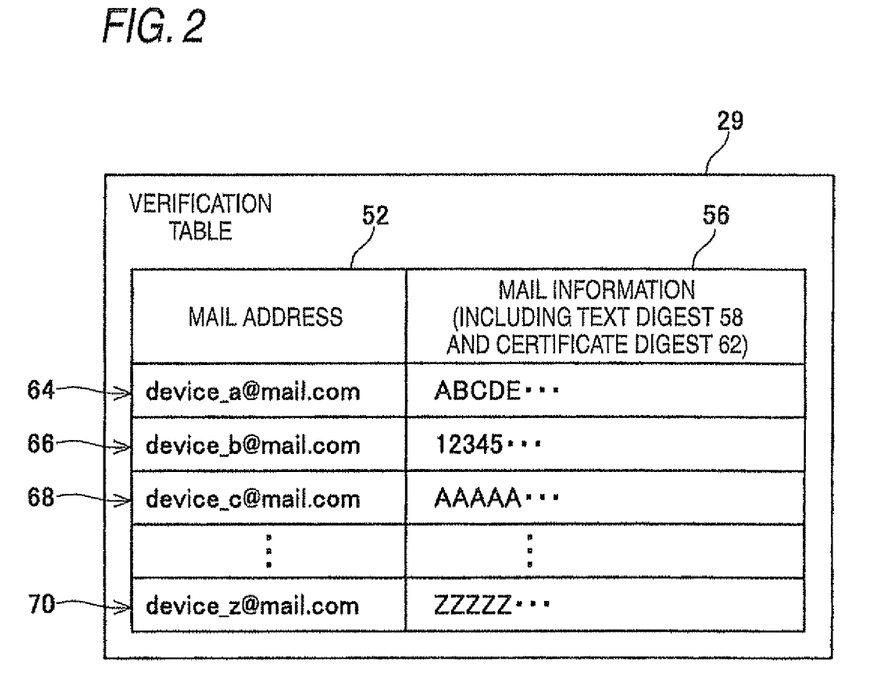
FIG. 2 shows one example of stored contents of a verification table.

Subsequently, the contents of storage of the verification table 29 (see FIG. 1) of the storage unit 24 will be described. FIG. 2 shows one example of the contents of storage of the verification table 29. The verification table 29 includes plural pieces of combination information 64 to 70. Each of the pieces of combination information 64 to 70 is information in which a mail address 52 is associated with mail information 56. The mail address 52 shows a mail address of the received electronic mail. In the exemplary embodiment, plural mail addresses are stored in the verification table 29. In the example of FIG. 2, four kinds of mail addresses are shown. The mail information 56 shows text information about the electronic mail, a device certificate attached to the electronic mail and related information (for example, the time and date of receipt of the electronic mail). Information about an encrypted text digest 58 and information about an encrypted certificate digest 62 are further included in the mail information 56.

(Stored Contents of Certificate Table 30)

Figure 3:
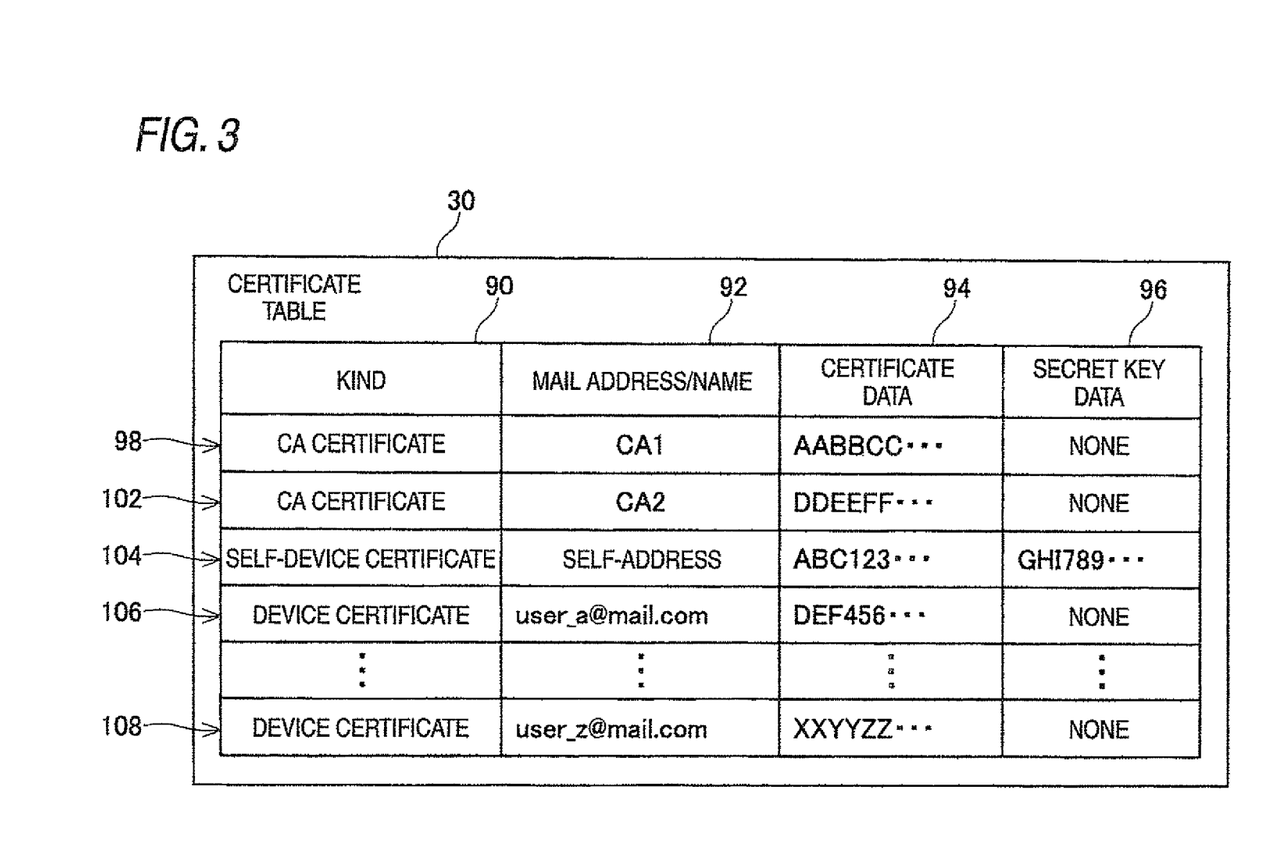
FIG. 3 shows one example of stored contents of a certificate table.

Subsequently, the contents of storage of the certificate table 30 (see FIG. 1) of the storage unit 24 will be described. FIG. 3 shows one example of the contents of storage of the certificate table 30. The certificate table 30 includes plural pieces of combination information 98 to 108. Each of the pieces of combination information 98 to 108 is information in which a kind 90 is associated with a mail address/name 92, certificate data 94 and secret key data 96. The kind 90 shows a kind of certificate. A "CA certificate" shows CA's own certificate issued by the certification authority (CA). A "self-device certificate" shows a device certificate of the multi-function device 10 acquired from the certification authority. A "device certificate" shows a device certificate of another communication apparatus. The mail address/name 92 shows a name of a certificate or a mail address corresponding to each of the certificates. For example, when a kind of certificate is the "CA certificate", a name of the CA is stored. When a kind of certificate is the "self-device certificate", a mail address of the multi-function device 10 is stored. When a kind of certificate is the "device certificate", a mail address of another communication apparatus is stored. The certificate data 94 is all the data of various certificates. The secret key data 96 is a secret key of the multi-function device 10. Therefore, the secret key data 96 is not stored in the pieces of combination information 98, 102, 106 and 108 other than the "self-device certificate".

The multi-function device 10 can previously acquire a self-device certificate. For example, when the multi-function device 10 sends a request to a predetermined certification authority, the predetermined certification authority creates a device certificate in response to the request and sends the device certificate to the multi-function device 10. Consequently, the multi-function device 10 can acquire the device certificate. Alternatively, for example, a user can make the certification authority create the device certificate of the multi-function device 10 using an external device (for example, a PC) other than the multi-function device 10. The user stores the device certificate of the multi-function device 10 acquired in the external device in USB memory. The user inserts the USB memory into the USB interface 18 (see FIG. 1). Consequently, the multi-function device 10 can acquire the device certificate.

(Processing Executed by Multi-Function Device 10)

Figure 4:
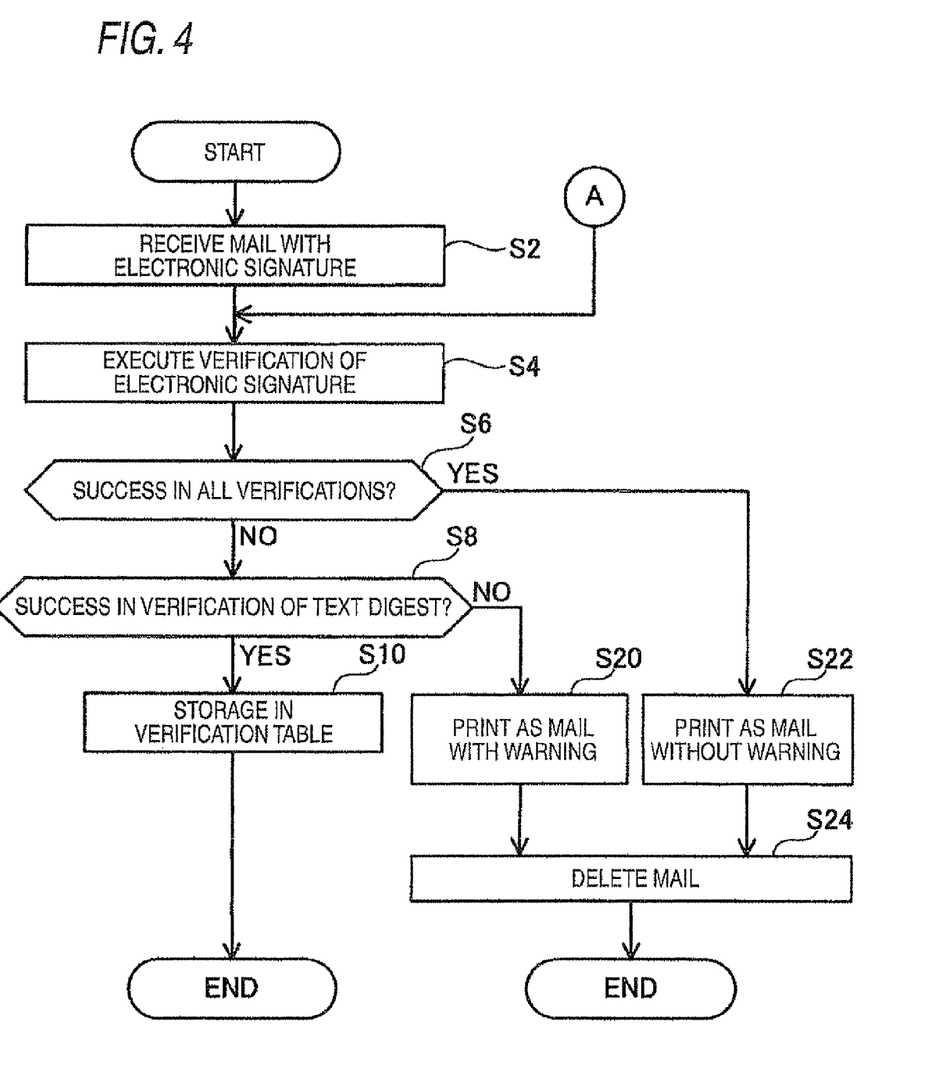
FIG. 4 shows a flowchart of processing executed by the multi-function device.

Subsequently, processing executed by the control unit 12 of the multi-function device 10 will be described. FIG. 4 shows a flowchart of processing executed at the time when the multi-function device 10 receives the electronic mail 36. The present processing is started every predetermined timing for accessing the POP3 server 8. In S2, the control unit 12 receives the electronic mail 36 to which electronic signatures (a first electronic signature (that is, an encrypted certificate digest included in a device certificate) and a second electronic signature (that is, an encrypted text digest)) are attached from the POP3 server 8. The control unit 12 stores the received electronic mail 36 in the work area 27 (see FIG. 1). Then, the control unit 12 executes verification of the electronic signatures attached to the electronic mail 36 (S4). Concretely, the verification of the electronic signatures includes verification of a CA certificate, verification of the expiration date of a device certificate and verification of the encrypted text digest. Each of the verifications will hereinafter be described in detail.

(Verification of CA Certificate)

The control unit 12 verifies whether or not a CA certificate (hereinafter called a target CA certificate) issued by the certification authority for authenticating a device certificate attached to the electronic mail 36 is stored in the certificate table 30. When the target CA certificate is not stored in the certificate table 30, the control unit 12 determines that the electronic mail fails in verification. When the target CA certificate is stored in the certificate table 30, the control unit 12 creates a first certificate digest by digesting information other than the encrypted certificate digest in the device certificate attached to the electronic mail 36. Further, the control unit 12 creates a second certificate digest by decoding the encrypted certificate digest included in the device certificate attached to the electronic mail 36 using a public key of certification authority included in the target CA certificate. Further, the control unit 12 determines whether or not the first certificate digest matches with the second certificate digest. Further, the multi-function device 10 determines whether or not a mail address of a sending source of the electronic mail 36 matches with a mail address included in the device certificate attached to the electronic mail 36. When the two digests match and the two mail addresses match, the control unit 12 determines that the electronic mail succeeds in verification. When the two digests do not match or the two mail addresses do not match, the control unit 12 determines that the electronic mail fails in verification.

(Verification of Expiration Date of Device Certificate)

The control unit 12 specifies the time and date when the electronic mail 36 is received. Further, the control unit 12 determines whether or not the specified time and date is included between the start time and the end time of the expiration date of the device certificate attached to the electronic mail 36. When the time and date is included, the control unit 12 determines that the electronic mail succeeds in verification. When the time and date is not included, the control unit 12 determines that the electronic mail fails in verification.

(Verification of Encrypted Text Digest)

The control unit 12 creates a first text digest by digesting a text of the electronic mail 36 using a hash function. Further, the control unit 12 creates a second text digest by decoding the encrypted text digest attached to the electronic mail 36 using a public key included in a device certificate (or a device certificate stored in the certificate table 30 in a state of being associated with a mail address of a sending source of the electronic mail 36) attached to the electronic mail 36. Then, the control unit 12 determines whether or not the first text digest matches with the second text digest. When the two digests match, the control unit 12 determines that the electronic mail succeeds in verification. When the two digests do not match, the control unit 12 determines that the electronic mail fails in verification.

Then, in S6 of FIG. 4, the control unit 12 determines whether or not to succeed in all the verifications (in the exemplary embodiment, verification of the CA certificate, verification of the expiration date of the device certificate and verification of the encrypted text digest) executed in S4. In the case of succeeding in all the verifications (YES in S6), the control unit 12 prints the electronic mail 36 (S22). Then, the control unit 12 deletes the electronic mail 36 from the work area 27 (S24) and ends the processing. In the case of failing in at least one verification (NO in S6), the control unit 12 proceeds to S8. The control unit 12 determines whether or not to succeed in the verification of the encrypted text digest in S8. In the case of succeeding in the verification of the encrypted text digest (YES in S8), the control unit 12 proceeds to S10. In the case of failing in the verification of the encrypted text digest (NO in S8), the control unit 12 prints the electronic mail 36 in a state of adding a warning indicating failure in the verification of the encrypted text digest (S20). Then, the control unit 12 deletes the electronic mail 36 from the work area 27 (S24) and ends the processing.

In S10 of FIG. 4, the control unit 12 stores information about the electronic mail 36 in the verification table 29 (see FIG. 2). Concretely, the control unit 12 stores combination information in which the mail address 52 of a sending source of the electronic mail 36 is associated with the mail information 56 in the verification table 29 (see FIG. 2). Here, the mail information 56 includes the encrypted text digest 58 attached to the electronic mail 36 and the certificate digest 62 included in the device certificate attached to the electronic mail 36. When this processing is ended, the control unit 12 ends the processing.

Referring to a flowchart of FIG. 5, processing at the time when the control unit 12 of the multi-function device 10 again executes verification of the electronic mail 36 will be described. A user of the multi-function device 10 can designate one piece of combination information from the plural pieces of combination information 64 to 70 stored in the verification table 29 by operating the operation unit 16 of the multi-function device 10. Further, the user can execute an operation for determining that verification of the designated combination information is again executed. The control unit 12 monitors execution of this operation (S12). In the case of inputting instructions (YES in S12), the control unit 12 proceeds to S16.

In S16, the control unit 12 specifies a device certificate (the device certificate is included in the mail information 56) included in the combination information designated in S12. Then, the control unit 12 specifies information (for example, a name of the certification authority) about the certification authority included in the specified device certificate. Further, the control unit 12 determines whether or not another combination information (hereinafter called target combination information) including the device certificate including the information about the specified certification authority is present in the verification table 29. In the case where the target combination information is present (YES in S16), the control unit 12 specifies the target combination information and the combination information designated in S12 as a verification target for again executing verification (S18). Then, the control unit 12 executes the processing of S4 or later of FIG. 4. On the other hand, in the case where the target combination information is not present (NO in S16), the control unit 12 specifies only the combination information designated in S12 as the verification target for again executing verification, and executes the processing of S4 or later of FIG. 4.

In the processing of S4 or later of FIG. 4 executed through S18 of FIG. 5, the control unit 12 executes the processing of S4 or later of FIG. 4 with respect to each of the plural pieces of combination information (the target combination information and the combination information designated in S12 of FIG. 5) which are the verification target. The control unit 12 first executes the processing of S4 or later with respect to the combination information designated in S12 of FIG. 5. In the case of succeeding in all the three verifications (verification of the CA certificate, verification of the expiration date of the device certificate and verification of the encrypted text digest) related to the electronic signature executed in S4 herein (YES in S6), the electronic mail text (the electronic mail text is included in the mail information 56) included in the combination information designated in S12 of FIG. 5 is printed (S22). Incidentally, in verification processing of the expiration date at the time of receipt of electronic mail, the time and date of the receipt of the electronic mail is used as the reference. However, in further verification processing of the expiration date, the time and date of execution of the processing is used as the reference. The following situations are considered as the case of succeeding in further verification in spite of failing in verification at the time of receipt.

(1) For example, when a CA certificate for authenticating a device certificate attached to electronic mail is not stored in the certificate table 30 at the time of receipt of the electronic mail, the electronic mail fails in verification of the CA certificate at the time of the receipt. Thereafter, for example, the CA certificate is stored in the certificate table 30 according to user's instructions. In this case, the electronic mail succeeds in further verification of the CA certificate, (2) When the time and date of receipt of the electronic mail is earlier than the start time of the expiration date of the device certificate attached to the electronic mail, for example, the electronic mail fails in verification of the expiration date at the time of the receipt. Thereafter, when further verification is executed at the timing between the start time and the end time of the expiration date of the device certificate, the electronic mail succeeds in the further verification of the expiration date.

When the control unit 12 executes the processing of S4 or later with respect to the combination information designated in S12 of FIG. 5, the control unit 12 then executes the processing of S4 or later with respect to the target combination information. An electronic mail text included in the target combination information can also be printed in the printing processing of S22.

A user can designate one piece of combination information from the plural pieces of combination information 64 to 70 stored in the verification table 29 by operating the operation unit 16. Further, the user can execute an operation for deleting the designated combination information. The control unit 12 monitors execution of the operation (S14). In the case of inputting instructions (YES in S14), the control unit 12 deletes the combination information designated in S14 from the verification table 29 (S15).

The multi-function device system 2 according to the exemplary embodiment has been described. According to the multi-function device 10 of the exemplary embodiment, even if the verification of the electronic signature attached to the received electronic mail 36 is failed, verification can be again executed with respect to the electronic mail, which has a possibility of succeeding in the verification of the electronic signature by again executing the verification. As a result, this electronic mail can be printed by again executing the verification and succeeding in the verification. As a result, it is possible to provide the printed matter with high reliability.

Further, according to the multi-function device 10, electronic mail, which does not have the possibility of succeeding in the verification in the case of again executing the verification (electronic mail failing in the verification of the encrypted text digest), can be printed. Further, the electronic mail (electronic mail which succeeds in the verification of the encrypted text digest but fails in the other verification (verification of the certification authority certificate and/or verification of the expiration date)), which has the possibility of succeeding in the verification in the case of again executing the verification, is stored in the verification table 29, and all the verifications can be again executed. Incidentally, it is not necessary to execute the verification of the encrypted text digest in further verification. In this case, a processing load of the further verification can be reduced.

According to the multi-function device 10, the electronic mail succeeding in all the verifications can be printed in a state in which a warning is not added. Further, according to the multi-function device 10, the electronic mail failing in the verification of the encrypted text digest can be printed in a state of adding the warning. As a result, a user can know that the electronic mail is printed by either course.

Figure 5:
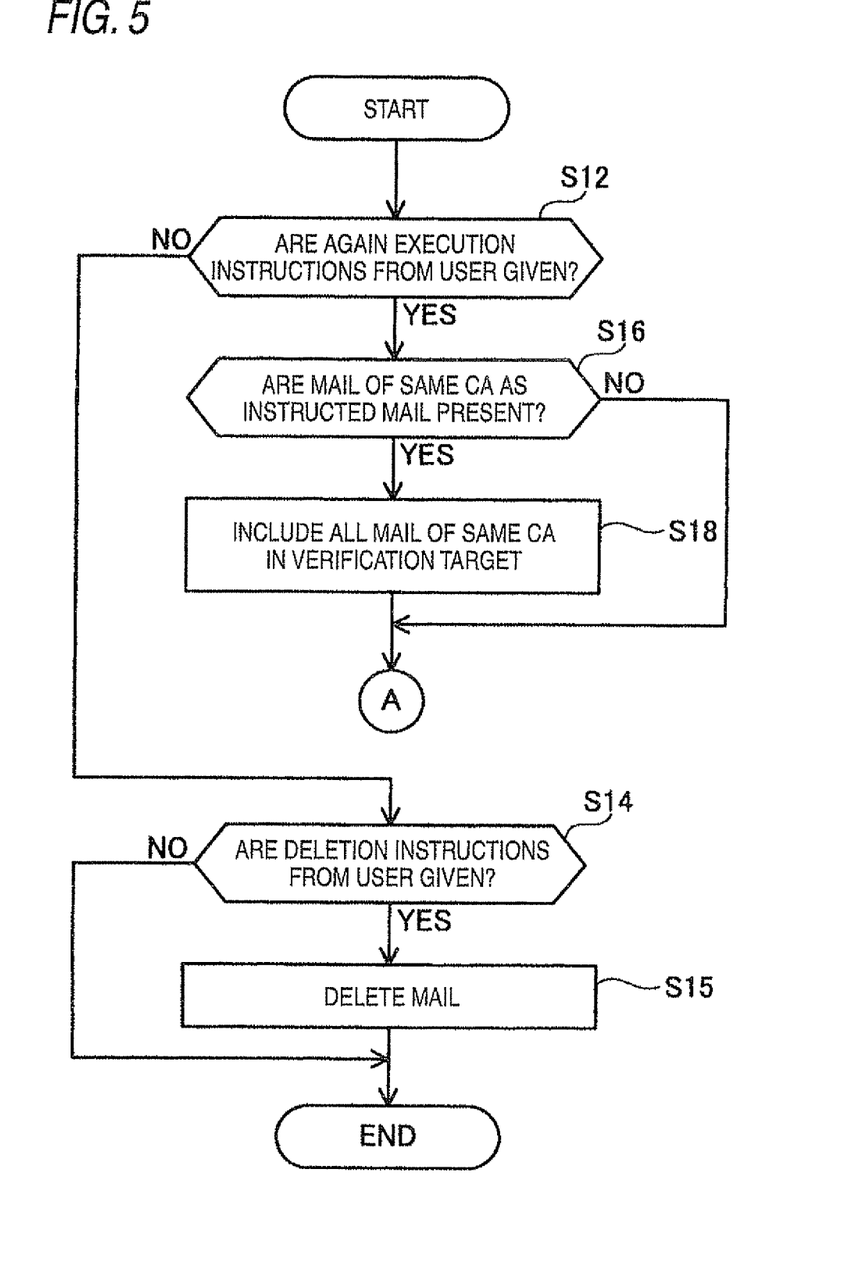
FIG. 5 shows another flowchart of processing executed by the multi-function device.

Further, by executing the processing of S16 and S18 of FIG. 5, further verification can be automatically executed with respect to another electronic mail to which the device certificate authenticated by the same certification authority is attached as well as the electronic mail designated by a user.

The exemplary embodiment of the invention has been described above in detail, but the exemplary embodiment is only illustrative and the claims are not limited thereby. The art described in the claims includes various modifications and changes of the concrete examples described above.

The multi-function device 10 may store the received electronic mail 36 in the verification table 29 before verification at the time of receipt is executed. When the electronic mail 36 succeeds in verification of the encrypted text digest and fails in further verification, the multi-function device 10 may maintain the electronic mail 36 in a state of storing the electronic mail 36 in the verification table 29.

The multi-function device 10 may again execute verification every predetermined time even when instructions to again execute the verification are not inputted from a user.

Verification may be again executed using storage of a new CA certificate in the certificate table 30 as a trigger.

When the time of receipt of electronic mail is later than the end time of the expiration date included in a device certificate attached to the electronic mail in verification of the expiration date at the time of the receipt, the multi-function device 10 may make a decision of NO in S8 and execute printing with a warning. Further, when a mail address of a sending source of electronic mail does not match with a mail address included in the device certificate attached to the electronic mail in verification of a CA certificate, the multi-function device 10 may make a decision of NO in S8 and execute printing with a warning. In these cases, since there is no possibility of succeeding in further verification of the expiration date, the multi-function device 10 may make the decision of NO in S8 and execute the printing with the warning. In these cases, the warning may include information indicating failure in any verification concretely.

The above-described technical elements or the drawings exert technical utility singly or by various combinations, and are not limited to combinations described in the claims at the time of the application. Also, the above-described art can simultaneously achieve plural purposes, and the achievement itself of one of the purposes has technical utility.

What is claimed is:
1. A communication apparatus comprising:
a first data storage;
a second data storage;
a third data storage for storing a particular certificate issued by a particular certificate authority;

a printing device;

a processor; and memory storing computer readable instructions, that cause, when executed by the processor, the communication apparatus to implement:

receiving an electronic mail;

storing the received electronic mail in the first data storage;

executing a first verification, the first verification comprising determining whether a certificate attached to the received electronic mail matches the particular certificate stored in the third data storage;

generating a first text digest from a text of the received electronic mail stored in the first data storage;

generating a second text digest from an encrypted text of the received electronic mail;

executing a second verification, the second verification comprising determining whether the first text digest matches the second text digest;

controlling the printing device to print the received electronic mail when the first verification indicates verification successful and the second verification indicates verification successful;

controlling the printing device to print the received electronic mail when the second verification indicates verification failed;

deleting the received electronic mail from the first data storage in response to printing the received electronic mail;

storing an address of a sender of the received electronic mail and its related mail information in the second data storage when the second verification indicates verification successful and when the first verification indicates verification failed, where the related mail information comprises the received electronic mail and a certificate of the received electronic mail;

executing a third verification, the third verification comprising determining whether a certificate attached to a specific electronic mail in a specific mail information stored in the second data storage matches the particular certificate stored in the third data storage; and controlling the printing device to print the specific electronic mail when the third verification indicates verification successful.

2. The communication apparatus according to claim 1, wherein the computer readable instructions further cause, when executed by the processor, the communication apparatus to implement:

controlling the printing device to print the received electronic mail in a first format when the first verification indicates verification-successful and the second verification indicates verification successful; and controlling the printing device to print the received electronic mail in a second format when the second verification indicates verification-failed, wherein the second format is different from the first format.

3. The communication apparatus according to claim 2, wherein the second format comprises a message to indicate that the second verification failed.

4. The communication apparatus according to claim 1, wherein the computer readable instructions further cause, when executed by the processor, the communication apparatus to implement:

deleting the address of the sender of the received electronic mail and its related mail information from the second data storage in accordance with an instruction from a user.

5. The communication apparatus according to claim 1, wherein the computer readable instructions further cause, when executed by the processor, the communication apparatus to implement:

controlling the printing device to print the received electronic mail when the first verification indicates it is determined that the certificate attached to the received electronic mail matches the particular certificate stored in the third data storage and the second verification indicates it is determined that the first text digest matches the second digest.

6. The communication apparatus according to claim 1, wherein the computer readable instructions further cause, when executed by the processor, the communication apparatus to implement:

controlling the printing device to print the received electronic mail when the second verification indicates it is determined that the first text digest does not match the second text digest.

7. The communication apparatus according to claim 1, wherein the computer readable instructions further cause, when executed by the processor, the communication apparatus to implement:

allowing a user to select a combination of a specific address and its related mail information stored in the second data storage for the third verification;

executing the third verification, the third verification comprising determining whether the certificate included in the related mail information of the selected combination matches the particular certificate stored in the third data storage; and controlling the printing device to print the electronic mail included in the mail information of the selected combination when the third verification indicates verification successful.

8. The communication apparatus according to claim 7, wherein the computer readable instructions further cause, when executed by the processor, the communication apparatus to implement:

controlling the printing device to print the electronic mail included in the mail information of the selected combination when the third verification indicates it is determined that the certificate included in the related mail information matches the particular certificate stored in the third storage device.

9. The communication apparatus according to claim 7, wherein the computer readable instructions further cause, when executed by the processor, the communication apparatus to implement:

determining the particular certificate authority that has authenticated the certificate in the mail information of the selected combination;

determining whether another certificate in another mail information stored in the second data storage is authenticated by the particular certificate authority;

determining whether the certificate in the mail information of the selected combination matches the particular certificate stored in the third data storage;

controlling the printing device to print the electronic mail included in the mail information of the selected combination when it is determined that the certificate in the mail information of the selected combination matches the particular certificate stored in the third data storage;

determining whether the another certificate in the another mail information stored in the second data storage matches the particular certificate stored in the third data storage; and controlling the printing device to print the electronic mail included in the another mail information stored in the second data storage when it is determined that the another certificate in the another mail information stored in the second data storage matches the particular certificate stored in the third data storage.

* * * * *